United States Patent [19]

Shimoyama

[11] Patent Number: 5,246,324
[45] Date of Patent: Sep. 21, 1993

[54] STRUCTURE FOR MOUNTING AN INSTRUMENT ON A BODY

[75] Inventor: Susumu Shimoyama, Saitama, Japan

[73] Assignee: Pioneer Electric Corporation, Tokyo, Japan

[21] Appl. No.: 914,134

[22] Filed: Jul. 17, 1992

[30] Foreign Application Priority Data

Oct. 17, 1991 [JP] Japan ............... 3-093170[U]

[51] Int. Cl.⁵ ............... F16B 19/00; F16B 33/00; F16B 34/22
[52] U.S. Cl. ................... 411/371; 411/258; 411/301; 411/429
[58] Field of Search ............ 411/113, 301–303, 411/183, 371, 372, 377, 429, 431, 910, 104, 258

[56] References Cited

U.S. PATENT DOCUMENTS

| | | | |
|---|---|---|---|
| 2,138,850 | 12/1938 | Garnier | 411/301 |
| 2,257,589 | 9/1941 | Brackett et al. | 411/301 |
| 2,340,589 | 2/1944 | Harpoothian | 411/301 |
| 2,401,824 | 6/1946 | Gladden et al. | 411/113 |
| 2,477,429 | 7/1949 | Swanstrom et al. | 411/104 X |
| 2,986,188 | 5/1961 | Karp et al. | 411/113 X |
| 3,411,816 | 11/1968 | Andrews et al. | 411/431 X |
| 4,295,766 | 10/1981 | Shaw | 411/113 |

Primary Examiner—Neill R. Wilson
Attorney, Agent, or Firm—Nikaido, Marmelstein, Murray & Oram

[57] ABSTRACT

A pair of side panels of a car stereo have threaded holes. A pair of brackets are secured to the side panels for mounting the car stereo on a frame of an automobile. A preventing sheet is attached to a reverse side of the side panel for preventing chips broken off from the screws and the threaded holes from falling in a space behind the side panel.

11 Claims, 3 Drawing Sheets

STRUCTURE FOR MOUNTING AN INSTRUMENT ON A BODY

BACKGROUND OF THE INVENTION

The present invention relates to a structure for mounting an instrument such as electric or electronic devices to a body.

The car stereo which is manufactured in a factory is mounted on a frame of an automobile in a factory of an automobile manufacturer. The stereo is mounted directly or through an appropriate holding device on the frame.

Referring to FIG. 5, a car stereo body 3 is inserted in a hole 1 formed in a dashboard of an automobile and mounted on a frame of the dashboard through L-shaped opposite brackets 1a, 1b and 2. The brackets 1a and 1b are secured to opposing inner walls of the hole 1. The brackets 2 are fixed to side panels 3a and 3b of the car stereo body 3 by screws 2b, each of which is screwed in a threaded hole 2a of the bracket 2 and a threaded hole 3c in the panel 3a. A horizontal plate portion of each of the brackets 1a and 1b has a pair of threaded holes 1c at positions corresponding to the threaded holes 2d. The car stereo body 3 is inserted in the hole 1, and the horizontal portions of the brackets 2 are rested on the horizontal portions of the brackets 1b and 1c. The brackets 2 are fixed to the brackets 1b and 1c by screws (not shown) screwed in the threaded holes 2d and 1c. Thus, the car stereo body 3 is securely mounted in the dashboard. Thereafter, a grille 4 is fastened on a front of the car stereo body 3, so that a space formed between the dashboard and the body 3 is covered.

When engaging the screw 2b in the threaded hole 3c of the car stereo body 3, the screw may be incorrectly inserted in the hole 3c. That is, an axis C2 of the screw 2b may be deflected from an axis C1 of the threaded hole 3c by an angle $\alpha$ as shown in FIG. 6. Since a female screw thread 3e of the threaded hole 3c and a male screw thread 2e of the screw 2b are not properly engaged with each other, the threads are broken when the screw 2b is forced into the hole 3c using a driver 5. Metal chips 6 broken off from the threads are pushed inward by the screw 2b and falls out of the screw hole 3c into the car stereo body 3. The fragments of these chips 6 easily adhere on circuits and other electric devices of the car stereo, thereby causing short circuit, malfunction and breakdown.

In addition, dust and other undesirable foreign substances are apt to accumulate in roots of the threads. As the screw 2b advances inward, the dust is also pushed by the screw and falls into the car stereo body.

Japanese Utility Model Application Laid-Open 64-385 discloses a structure for mounting a transistor on a board where the transistor is secured by a screw engaged in a threaded hole though a hole formed in insulating sheet adhered on the board. The size of the hole is slightly smaller than the threaded hole, so that the transistor is separated from the screw, and hence protected from the metal chips.

Japanese Utility Model Application Laid-Open 1-166811 discloses a rubber bush enclosing a screw for preventing the metal chips from dispersing. However, these structures are provided for preventing the metal chips of the screw from falling to the outside of the instrument. Therefore, the prior art does not effect to prevent the chips from entering the electric instrument through the screw hole.

SUMMARY OF THE INVENTION

An object of the present invention is to provide a structure for mounting an electrical instrument where chips broken off from a threaded hole are prevented from entering the electrical instrument, whereby the electrical and electronic devices thereof are reliably operated.

According to the present invention there is provided a structure for fastening a plate with screws on a side panel of an instrument having threaded holes comprising, a preventing member provided behind the side panel for preventing chips broken off from the screws and the threaded holes from falling in a space behind the side panel.

In an aspect of the invention, the preventing member is a sheet attached to an inner side wall of the side panel.

In another aspect, the preventing member is a coating provided in the threaded hole at an inner end portion. Chips and foreign substances are trapped by the coating. The coating may be used independently or together with the sheet.

Thus in accordance with the present invention, chips broken off from the threads of the screw and the threaded holes are trapped by the preventing member without entering in a case of the instrument and adhering to a circuit provided therein. As a result, malfunction and breakdown of the device are prevented, thereby improving the reliability of the device.

The other objects and features of this invention will become understood from the following description with reference to the accompanying drawings.

DETAILED DESCRIPTION OF THE PREFERRED EMBODIMENTS

Figure 1:
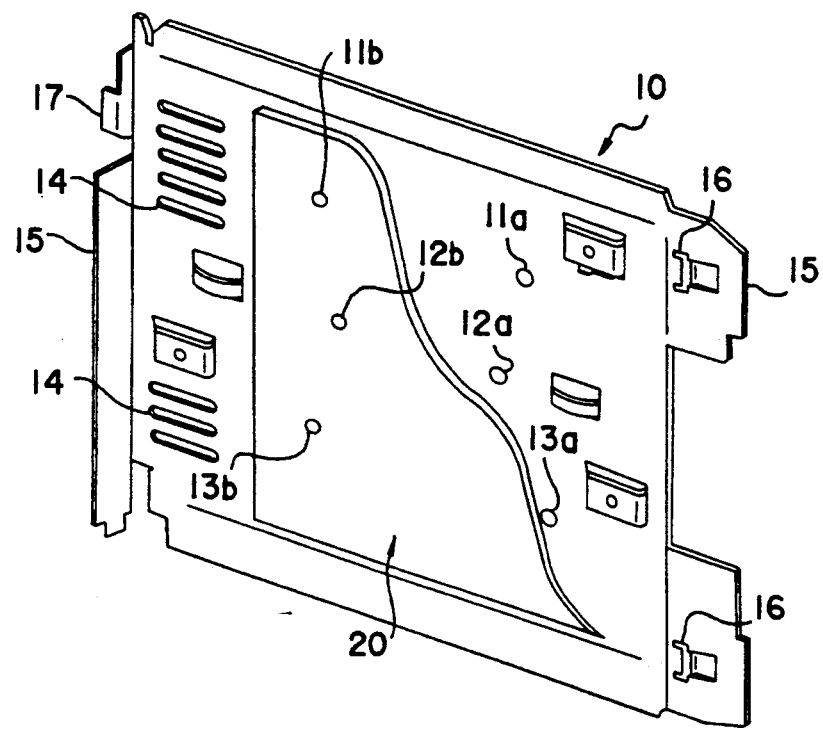
FIG. 1 is a perspective view of a side panel which is to be attached to a body of a car stereo.
Figure 5:
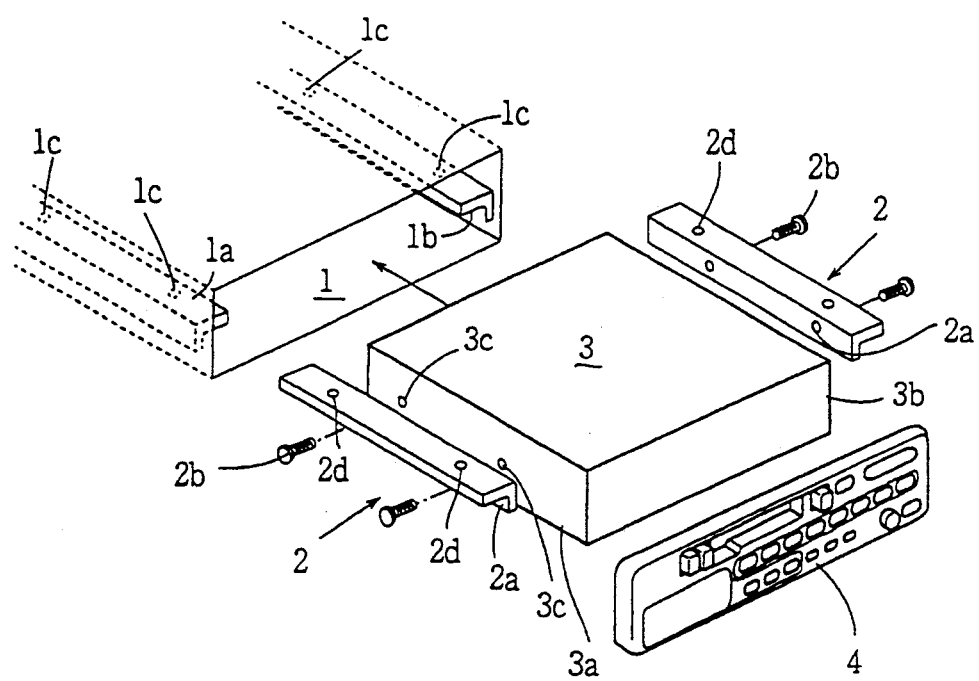
FIG. 5 is a perspective view explaining a structure for mounting a car stereo in an automobile.

Referring to FIG. 1, a side panel 10 of a car stereo body as that shown in FIG. 5 has various connecting portions 15, engaging recesses 16 and engaging projections 17 formed along the periphery thereof which are provided for attaching the side panel 10 to panels of other sides of the car stereo. A plurality of slits 14 are formed on the panel for cooling the car stereo and for reducing the weight of the body.

A plurality of threaded holes 11a and 11b, 12a and 12b, and 13a and 13b for attaching a bracket 30 (FIG. 2), are formed in the side panel 10 by punching the panel and tapping so that the car stereo may be mounted on various types of automobiles.

A sheet 20 of nonwoven fabric is adhered on the inner wall of the side panel 10 by organic adhesive. The sheet 20 comprises natural or artificial fibers and has a thickness of several millimeters.

Figure 2:
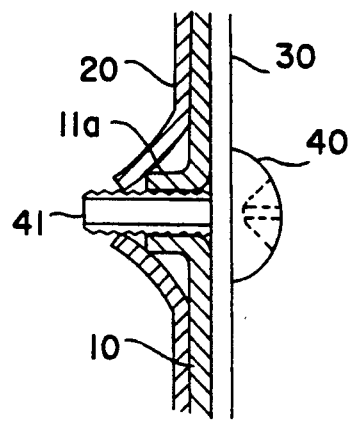
FIG. 2 is a sectional view explaining a structure for securing a bracket to the side panel.

Referring to FIG. 2, in order to fix the bracket 30 on the side panel 10, appropriate threaded holes for the bracket are selected. A screw 40 is inserted through a hole of the bracket 30 and screwed in the selected threaded hole, for example 11a, formed in the side panel 10. Upon the abutment of the screw 40 against the sheet 20, an end 41 thereof breaks through the sheet 20 and projects into the inner space of the car stereo body.

Figure 6:
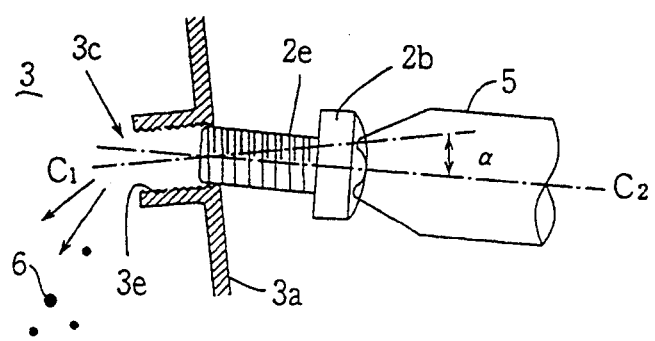
FIG. 6 is a sectional view explaining engagement of a screw.

If the threads of the screw 40 and the threaded hole 11a are not properly engaged with each other, metal chips break off as shown in FIG. 6. However, the chips are caught in the unwoven fabric sheet 20. Dust between the threads of the hole 11a if pushed out and falls on the fabric sheet 20 as the screw 40 advances. Thus, neither the broken chips nor dust enters the inner space of the car stereo body.

Cross slits or small holes may be formed in the nonwoven fabric sheet 20 at positions corresponding to the threaded holes, so that the screws 40 can easily penetrate through the sheet, especially if the screw end 41 is blunt.

The sheet 20 may be substituted with an elastic sheet made of rubber or synthetic resin which is stretched when pushed by the screw end 41 of the screw 40. Since the rubber sheet is airtight, it is advisable to dispose small pieces of rubber over each of the threaded holes 11a, 11b, 12a, 12b, 13a, and 13b for ensuring the ventilation of the stereo.

Figure 3:
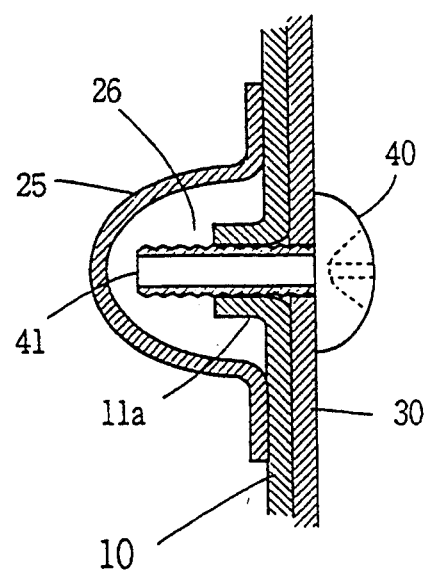
FIG. 3 is a sectional view showing a structure for securing a bracket to the side panel in accordance with a second embodiment of the present invention.

Referring to FIG. 3, a cap 25 having a space 26 may be fixed to the inner wall of the side panel 10 to cover each hole. The caps 25 may or may not be of resilient material. If the cap 25 is resilient, the space 26 can be expanded by the screw 40 so that the screws having various lengths can be used without affecting the benefit of the present invention. On the other hand, when the cap 25 is not resilient, the space 26 should be adapted to have an enough capacity to house the largest screw which is expected to be used. Thus, the broken screw chips and dust are satisfactorily trapped in the spaces 26.

Furthermore, a sheet made of nonresilient material may be used, in which case the sheet is provided to form a space between the sheet and the side panel 10 for allowing screws 40 to be projected into the space.

Figure 4:
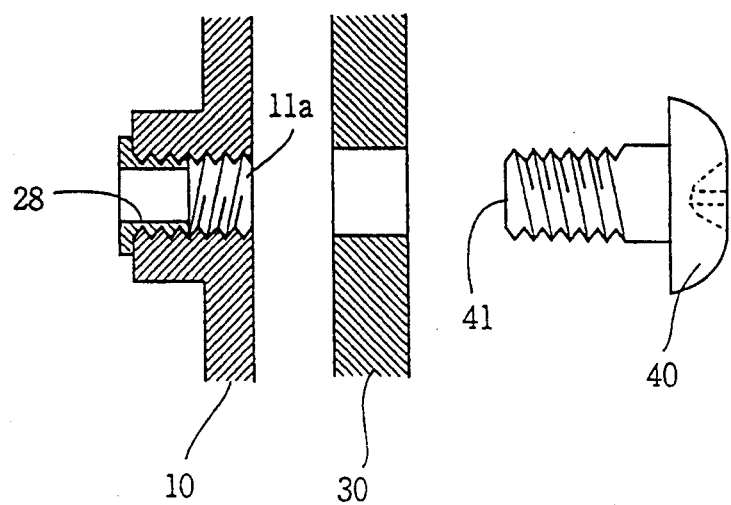
FIG. 4 is a sectional view showing a structure for fixing a bracket to the side panel in accordance with a third embodiment of the present invention.

Referring to FIG. 4, in another embodiment of the present invention, the inner periphery of the threaded hole 11a is lined at an inner end portion with a coating 28 of adhesive material, such as nylon resin and urethane resin, which is on the market as fastening material for screws. The coating 28 is sufficiently thick to cover the thread of the threaded hole 11a and about several millimeters wide from the innermost end of the hole 11a.

The thread chips and dust which are swept inward by the screw 40 adhere on the coating 28 and are held there without falling into the body. The coating 28 is also effective in increasing the fastening strength of the screw 40 to the side panel 10 so that the car stereo body can be securely fixed to a dashboard of an automobile.

The coating 28 may also be provided in the structures shown in FIGS. 2 and 3, thereby preventing the chips and dust from entering the car stereo body with further reliability.

The present invention may be applied to any mounting structure where a screw is used.

From the foregoing it will be understood that the present invention provides a structure for fixing a body of an electric or electronic instrument where fragments of metal chipped off from threads when the screw is not correctly inserted into a threaded hole, and other foreign substances such as dust are prevented from falling into the inner space of the body. Hence various electric and electronic devices disposed within the body are prevented from erroneous operations and troubles caused by theses substances, thereby improving the reliability of the instrument.

While the presently preferred embodiments of the present invention have been shown and described, it is to be understood that these disclosures are for the purpose of illustration and that various changes and modifications may be made without departing from the scope of the invention as set forth in the appended claims.

What is claimed is:

1. A structure for mounting a plate with screws on a side panel of an instrument having threaded holes, comprising:

a preventing conformal sheet member adheringly positioned along an interior side surface of the side panel and formed so as to conformingly engage with a threaded shaft of a screw when the screw is threadably connected with and through a threaded hole in the side panel, said conformal sheet member further conformingly engaging with the threaded shaft of the screw whereby chips broken off from the screws and the threaded holes are prevented from failing in a space behind the side panel beyond said conformal sheet member.

2. A structure according to claim 1, further comprising:

at least one cap member attachably positioned on an inner side surface of said conformal sheet member and aligned with the screw and threaded hole so as to cover an abutment of said conformal sheet member conformingly engaging with the threaded shaft of the screw.

3. A structure according to claim 1, wherein said conformal sheet member is further formed so as to allow penetration of the threaded shaft through said conformal sheet member while said conformal sheet member conformingly engages with the threaded shaft.

4. A structure according to claim 1, wherein said conformal sheet member includes at least one of a cross slit and a small hole so as to allow penetration by the threaded shaft through said conformal sheet member while said conformal sheet member conformally engages with the threaded shaft.

5. A structure according to claim 1, wherein said conformal sheet member is formed from a nonwoven fabric.

6. A structure according to claim 1, wherein said conformal sheet member is formed from rubber.

7. A structure according to claim 1, wherein said conformal sheet member is formed from a synthetic resin.

8. A structure according to claim 1, further comprising:

at least one coating member formed into the threaded hole of the side panel so as to line an inner peripheral surface of the threaded hole, said coating member acting in conjunction with said conformal sheet member to prevent chips broken off from the screws and the threaded holes from falling in a space behind the side panel beyond said conformal sheet member.

9. A structure according to claim 1, wherein said conformal sheet member is further adheringly positioned along the interior side surface of the side panel so as to define a space between said conformal sheet member and the interior side surface of the side panel.

10. A structure for mounting a plate with screws on a side panel of an instrument having threaded holes, comprising:

a preventing member adheringly positioned along an interior side surface of the side panel and formed so as to engage with a threaded shaft of a screw when the screw is threadably connected with and through a threaded hole in the side panel, said preventing member further surrounding the threaded shaft of the screw whereby chips broken off from the screws and the threaded holes are prevented from falling in a space behind the side panel beyond said preventing member, said preventing member including at least one cap member attachably positioned on the interior side surface of the side panel and aligned with the screw and threaded hole so as to cover an abutment of the threaded shaft of the screw.

11. A structure for mounting a plate with screws on a side panel of an instrument having threaded holes, comprising:

a preventing member adheringly positioned along an interior side surface of the side panel and formed so as to conformingly engage with a threaded shaft of a screw when the screw is threadably connected with and through a threaded hole in the side panel, said preventing member further engaging with the threaded shaft of the screw whereby chips broken off from the screws and the threaded holes are prevented from falling in a space behind the side panel beyond said preventing member, said preventing member including at least one coating member formed into the threaded hole of the said panel so as to line an inner peripheral surface of the threaded hole, said coating member acting so as to prevent chips broken off from the screws and the threaded holes from falling in a space behind the side panel beyond said preventing member.

* * * * *